(12) United States Patent
Winter (10) Patent No.: US 12,370,909 B2
(45) Date of Patent: Jul. 29, 2025

(54) HYBRID PROPULSION CONTROL SYSTEM UPDATE MODULE

(71) Applicant: RTX Corporation, Farmington, CT (US)

(72) Inventor: Michael Winter, New Haven, CT (US)

(73) Assignee: RTX CORPORATION, Farmington, CT (US)

( * ) Notice: Subject to any disclaimer, the term of this patent is extended or adjusted under 35 U.S.C. 154(b) by 489 days.

(21) Appl. No.: 17/245,148

(22) Filed: Apr. 30, 2021

(65) Prior Publication Data

US 2022/0348341 A1 Nov. 3, 2022

(51) Int. Cl.
*B64D 31/06* (2024.01)
*B64D 27/02* (2006.01)
*B64D 27/24* (2024.01)
*F02C 6/00* (2006.01)

(52) U.S. Cl.
CPC ............. *B64D 31/06* (2013.01); *B64D 27/02* (2013.01); *B64D 27/24* (2013.01); *F02C 6/00* (2013.01); *B64D 27/026* (2024.01); *F05D 2220/323* (2013.01)

(58) Field of Classification Search
CPC ......... B60L 53/54; B64D 31/06; B64D 27/02; B64D 27/04
See application file for complete search history.

(56) References Cited

U.S. PATENT DOCUMENTS

| | | | |
|---|---|---|---|
| 10,081,350 B2 | 9/2018 | Zhou | |
| 2005/0179588 A1* | 8/2005 | Kim | B60R 25/24 340/463 |
| 2007/0252554 A1* | 11/2007 | Feng | H01M 10/42 320/116 |
| 2012/0095662 A1 | 4/2012 | Roy et al. | |

(Continued)

FOREIGN PATENT DOCUMENTS

| CN | 207799388 U | 8/2018 |
|---|---|---|
| EP | 3243749 A1 | 11/2017 |

(Continued)

OTHER PUBLICATIONS

Search Report issued in European Patent Application No. 22171006.4; Application Filing Date Apr. 29, 2022; Date of Mailing Sep. 9, 2022 (8 pages).

*Primary Examiner* — Jason H Duger
(74) *Attorney, Agent, or Firm* — CANTOR COLBURN LLP (57) ABSTRACT

A hybrid propulsion update system includes a controller in signal communication with a replaceable battery. The controller includes a tuning parameters storage unit configured to store at least one tuning parameter corresponding to the replaceable battery. The controller is configured to execute at least one optimization algorithm that utilizes the tuning parameters to control operation of the hybrid electric aircraft according to a first performance. The tuning parameters storage unit is configured to receive at least one updated tuning parameter from a controller updating device. The (Continued)

controller executes the at least one optimization algorithm that utilizes the at least one updated tuning parameter such that the hybrid electric aircraft operates according to a second performance that improves upon the first performance.

6 Claims, 7 Drawing Sheets

(56) References Cited

U.S. PATENT DOCUMENTS

| | | | |
|---|---|---|---|
| 2014/0039697 A1* | 2/2014 | Weiler | A01G 25/165 |
| | | | 700/284 |
| 2015/0367950 A1* | 12/2015 | Rajashekara | B64D 27/10 |
| | | | 903/930 |
| 2016/0100531 A1* | 4/2016 | Ascherman | A01G 7/02 |
| | | | 700/283 |
| 2018/0095140 A1* | 4/2018 | Park | G01R 31/378 |
| 2018/0222343 A1* | 8/2018 | Uchida | G06Q 30/0631 |
| 2018/0269693 A1* | 9/2018 | Plag | H02J 7/007 |
| 2020/0409792 A1 | 12/2020 | Jacobs et al. | |
| 2022/0065174 A1* | 3/2022 | Chapman | B64D 27/357 |

FOREIGN PATENT DOCUMENTS

| | | |
|---|---|---|
| EP | 3623203 A1 | 3/2020 |
| WO | 2018010098 A1 | 1/2018 |

* cited by examiner

HYBRID PROPULSION CONTROL SYSTEM UPDATE MODULE

BACKGROUND

The subject matter disclosed herein generally relates to hybrid electric aircrafts, and more particularly, to an aircraft hybrid electric gas turbine engine system.

Hybrid electric aircraft use electricity to provide a portion of the power needed for propulsion by converting electricity into a propulsive force. However, battery storage capacity on an aircraft can be limited due to weight and size restrictions. In addition, the performance of the battery decreases as the battery degrades over time. Therefore, aircraft batteries have a typical life expectancy of about two to three years before they must be replaced.

BRIEF DESCRIPTION

According to a non-limiting embodiment, a hybrid propulsion update system includes a controller in signal communication with a replaceable battery. The controller includes a tuning parameters storage unit configured to store at least one tuning parameter corresponding to the replaceable battery. The controller is configured to execute at least one optimization algorithm that utilizes the tuning parameters to control operation of a hybrid electric aircraft according to a first performance. The tuning parameters storage unit is configured to receive at least one updated tuning parameter from a controller updating device. The controller executes the at least one optimization algorithm that utilizes the at least one updated tuning parameter such that the hybrid electric aircraft operates according to a second performance that improves upon the first performance.

According to another non-limiting embodiment, a hybrid propulsion updating system comprises a controller in signal communication with a replaceable battery installed on a hybrid electric aircraft. The controller includes a tuning parameters storage unit configured to store at least one tuning parameter corresponding to the replaceable battery. The controller is configured to execute at least one optimization algorithm that utilizes the tuning parameters to control operation of the hybrid electric aircraft according to a first performance. The tuning parameters storage unit is configured to receive at least one updated tuning parameter from a controller updating device. The controller executes the at least one optimization algorithm that utilizes the at least one updated tuning parameter such that the hybrid electric aircraft operates according to a second performance that improves upon the first performance According to still another non-limiting embodiment, a method is provided for updating a hybrid propulsion control system installed on a hybrid electric aircraft. The method comprises obtaining, by a controller, at least one tuning parameter stored in a tuning parameters storage unit. The at least one tuning parameter corresponds to a replaceable battery installed on the hybrid electric aircraft. The method further comprises executing, by the controller, at least one optimization algorithm that utilizes the tuning parameters such that the hybrid electric aircraft operates according to a first performance. The method further comprises storing, in the tuning parameters storage unit, at least one updated tuning parameter delivered from a controller updating device. The method further comprises executing, by the controller, the at least one optimization algorithm that utilizes the at least one updated tuning parameter such that the hybrid electric aircraft operates according to a second performance that improves upon the first performance.

A technical effect of the apparatus, systems and methods is achieved by providing a recharging sequence to selectively recharge batteries of a hybrid electric aircraft during ground-based operations as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As described above, aircraft batteries, such as lithium-ion batteries typically used in aircrafts, have a life expectancy of about two to three years before they must be replaced. However, continued innovation in lithium-ion battery technology predicts a continued improvement of power and energy density of about 8% each year over the next 25 years. Unlike batteries that are replaced every two to three years, the aircraft itself has a service life of about thirty years before being retired. Thus, a replacement battery installed 20 years from the date the aircraft entered service provides significant performance improvements compared to the batteries available near the time the aircraft entered service.

Various non-limiting embodiments described herein provide a power management system configured to manage a battery that can be repeatedly replaced over time. In addition, the power management system can receive updated tuning parameters associated with a replacement battery and execute one or more optimization algorithms that utilize the updated tuning parameters to control aircraft operation (e.g., thermal versus electrical thrust split) to optimize the performance of the aircraft. The performance can include, for example, engine set points or targeted set points such as, for example, mission fuel burn (e.g., fuel consumption efficiency) set points and/or engine economics (e.g., life cycle cost efficiency) set points.

Figure 1:
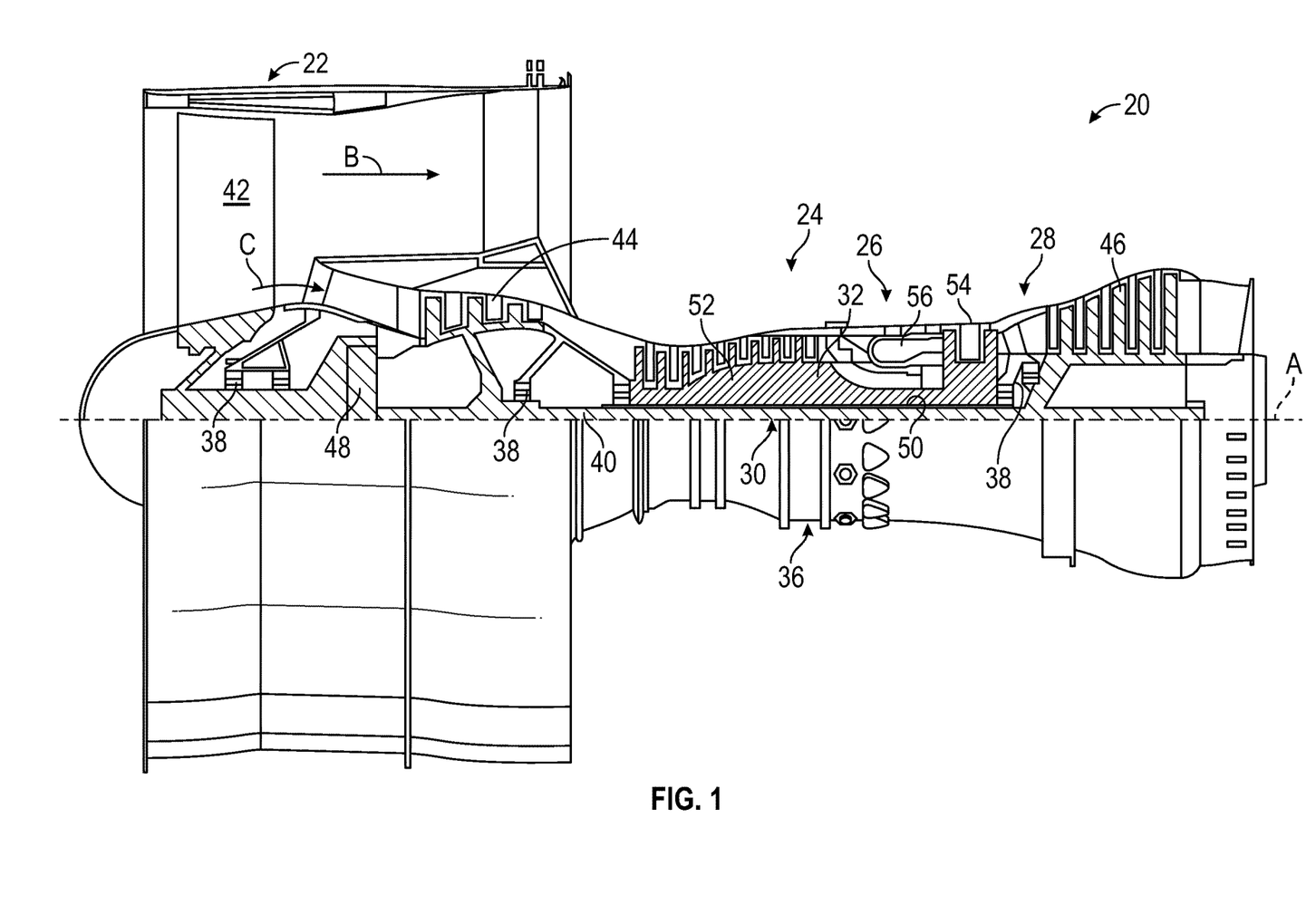
FIG. 1 is a partial cross-sectional illustration of a gas turbine engine, in accordance with a non-limiting embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
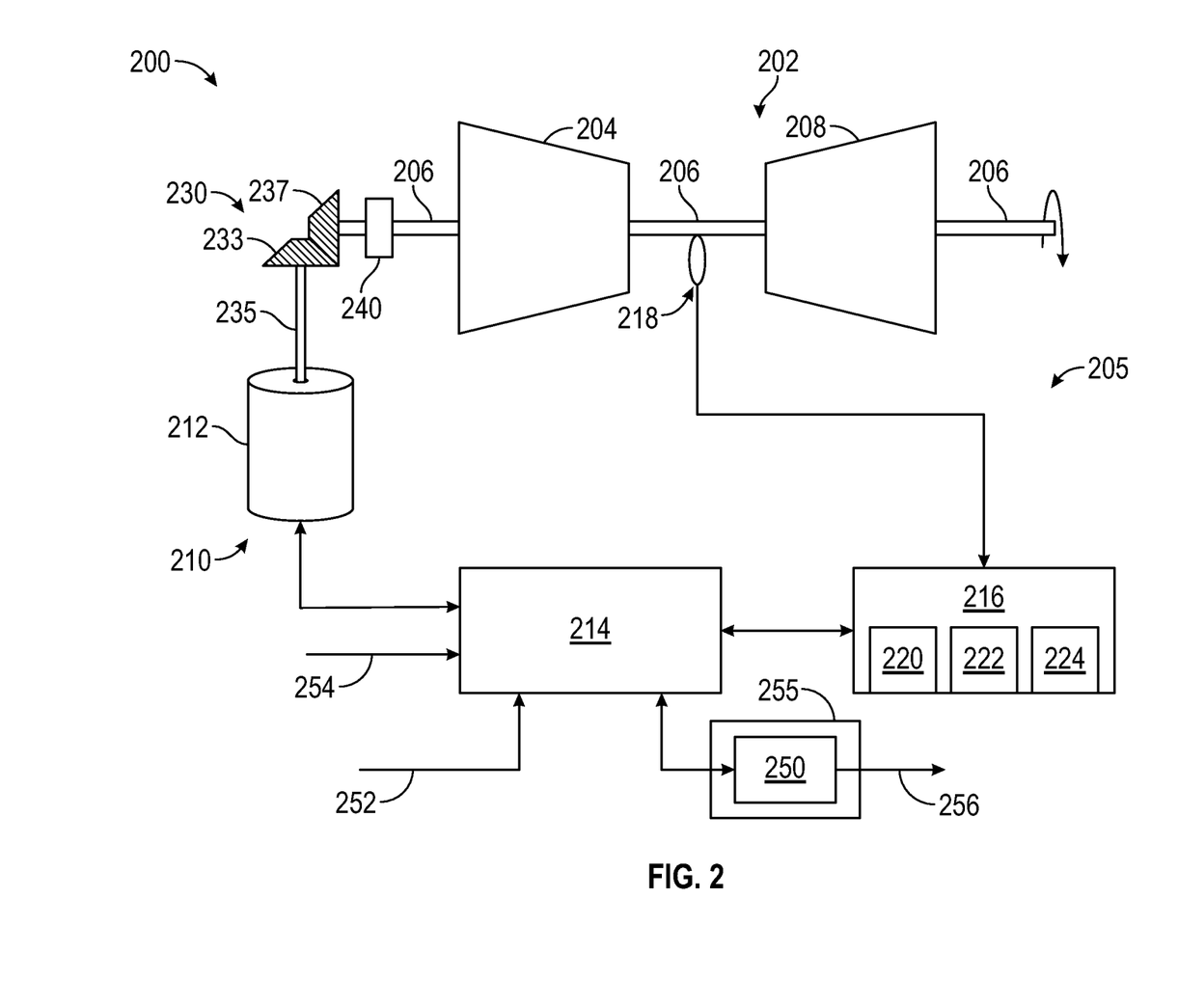
FIG. 2 is a schematic diagram of a hybrid electric gas turbine engine system including a power management system, in accordance with a non-limiting embodiment of the disclosure.

FIG. 2 illustrates portions of a hybrid electric gas turbine engine system 200 according to a non-limiting embodiment. The hybrid electric gas turbine engine system 200 includes a rotor system 202 and a power management system 205. The rotor system 202 includes at least one compressor section 204 and at least one turbine section 208 operably coupled to a shaft 206. The rotor system 202 can be a spool of the gas turbine engine 20 of FIG. 1, such as the low speed spool 30 or the high speed spool 32. For example, when embodied as the low speed spool 30, the at least one compressor section 204 can be equivalent to the low pressure compressor 44, the shaft 206 can be equivalent to the inner shaft 40, and the at least one turbine section 208 can be equivalent to the low pressure turbine 46 of FIG. 1. When embodied as the high speed spool 32, the at least one compressor section 204 can be equivalent to the high pressure compressor 52, the shaft 206 can be equivalent to the outer shaft 50, and the at least one turbine section 208 can be equivalent to the high pressure turbine 54 of FIG. 1.

In the example of FIG. 2, a battery charging system 210 is operably coupled to the rotor system 202. The battery charging system 210 includes a generator 212 operably coupled to the shaft 206. In the example of FIG. 2, a geared interface 230 operably couples the generator 212 to the shaft 206. The geared interface 230 can include, for instance, an auxiliary gear 233 coupled to an auxiliary shaft 235 driven by the generator 212. The geared interface 230 can also include a rotor gear 237 coupled to the shaft 206. The auxiliary gear 233 and the rotor gear 237 can each be beveled gears. The auxiliary shaft 235 can be a tower shaft that enables the generator 212 to be separated at a greater distance from the rotor system 202 than direct coupling to the shaft 206 would provide. Further separation of the generator 212 from the rotor system 202 can improve accessibility to the generator 212 for servicing and may reduce heating effects of the rotor system 202 on the generator 212 (e.g., due to fuel combustion). A disconnect 240, such as a clutch, can be positioned between the generator 212 and a portion of the shaft 206 such that the generator 212 can be selectively engaged and disengaged to rotate with rotation of the shaft 206. In alternate embodiments, the generator 212 is operably coupled to the shaft 206 absent the geared interface 230 (e.g., direct coupling).

The battery charging system 210 also includes converter electronics 214 in signal communication with the generator 212 and a replacement battery 250 included in a battery system 255. In some embodiments, the generator 212 is a motor-generator configurable in a generator mode to charge the replacement battery 250 and in a motor mode to provide supplemental rotation force to the rotor system 202 of gas turbine engine 20 of FIG. 1. The converter electronics 214 are configured to condition current from the generator 212 such that the replaceable battery 250 can be repeatedly recharged. The replaceable battery 250 can further be replaced with an updated or next-generation battery 250 as the currently installed battery 250 degrades overtime. That is, the battery charging system 210 can be installed with a given battery 250 at a first time period, and at a future date (e.g., subsequent time period), the given battery 250 can be replaced with an updated or next-generation battery 250. In one or more non-limiting embodiments, different replaceable batteries 250 that can be installed in the battery system 255 may correspond to different battery classes and/or categories. The given battery class and/or category can be preprogramed in the battery 250 such that the battery 250 is deterministic at the time of certification.

Different battery tuning parameters utilized by the controller 216 to operate the hybrid electric aircraft 200 can be stored in a controller updating device, which is described in greater detail below. The controller updating device can be configured to select one or more targeted updated tuning parameters associated with a given replacement battery 250, which can then be delivered to the controller 216. In this manner, the controller 216 can be provided with updated tuning parameters when an updated or next-generation battery 250 is installed in the battery system 255.

The generator 212 can include conventional generator/motor components, such as a rotor and stator, including a plurality of windings and/or permanent magnets. The converter electronics 214 can also include conventional current control electronics, such as filters, switching components, rectifiers, inverters, voltage converters, and the like. The generator 212 can perform as a variable frequency generator in a generator mode due to speed fluctuations of rotation of the shaft 206, which may be primarily driven by the at least one turbine section 208. Alternatively, a frequency normalizing component can interface with the generator 212 to produce a constant frequency output (e.g., through the converter electronics 214 or as a mechanical interface between the generator 212 and the shaft 206). In some embodiments, the generator 212 may be operable as a starter motor to partially or completely power rotation of the shaft 206 in a starting mode of operation (e.g., to start the gas turbine engine 20 of FIG. 1) and/or can provide supplemental power to the shaft 206 during various flight phases of the hybrid electric aircraft 200. Other uses and functions for the generator 212 are contemplated.

The converter electronics 214 can control charging of the battery system 255 responsive to a controller 216. The controller 216 can enable a flow of a charging current from the generator 212 or a power input 252 to charge the battery system 255 as regulated and conditioned through the converter electronics 214. The power input 252 can be an external input, such as power received through a plug interface while the hybrid electric aircraft 200 is on the ground at a ground-based power source, e.g., at a gate or service location. In some embodiments, the converter electronics 214 may receive electric current from an auxiliary power input 254 to provide a supplemental or alternative power source for charging the battery system 255. For instance, the auxiliary power input 254 may receive electric current from an auxiliary power unit (not depicted) or another instance of the gas turbine engine 20 on the hybrid electric aircraft 200. The charge stored in the battery system 255 can provide an electric current for a propulsion system use 256, which may include powering one or more electric motors of the hybrid electric aircraft 200 during various operational states and/or providing power to the generator 212 when operating in a motor mode, for instance, to assist in driving rotation of shaft 206. The propulsion system use 256 can be part of the gas turbine engine 20 that includes the rotor system 202 or another aircraft system, such as another instance of the gas turbine engine 20 on the hybrid electric aircraft 200.

In embodiments, the controller 216 of the battery charging system 210 can monitor one or more rotor system sensors 218 while the rotor system 202 is rotating. The rotor system sensors 218 can be any type or combination of sensors operable to measure aspects of the motion of the rotor system 202. For example, the rotor system sensors 218 can include one or more accelerometers, speed sensors, torque sensors, and the like. The rotor system sensors 218 can include existing sensors used for controlling the gas turbine engine 20. The controller 216 can control a charging of the battery system 255, for instance, by selecting the source of electric current received through the converter electronics 214. Data collected from the rotor system sensors 218 can be used to determine an operational status of a gas turbine engine 20 of FIG. 2. Alternatively, the operational status of a gas turbine engine 20 can be received as a signal or message from an alternate source, such as an engine system or aircraft communication bus. The controller 216 may also control other system aspects, such as controlling operation of the gas turbine engine 20 of FIG. 1. For example, the controller 216 can be integrally formed or otherwise in communication with a full authority digital engine control (FADEC) of the gas turbine engine 20. The rotor system sensors 218 need not be directly coupled to the controller 216, as sensor data or sensor-derived data can be observed or determined by another control (e.g., a FADEC) and provided to the controller 216.

In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the converter electronics 214 and/or other systems (not depicted).

The controller 216 is in signal communication with the battery system 255 and is configured to store one or more tuning parameters corresponding to the replaceable battery 250. The tuning parameters include, but are not limited to, charging rate, discharging rate, thermal characteristics, size, capacity and/or energy per unit mass. In one or more non-limiting embodiments, the controller 216 is configured to execute one or more optimization algorithms that utilize the tuning parameters such that the hybrid electric aircraft operates according to a first performance. The controller 216 is further configured to receive one or more updated tuning parameters from a controller updating device, which is described in greater detail below. Accordingly, the controller 216 can execute an optimization algorithm that utilizes one or more of the updated tuning parameters such that the hybrid electric aircraft operates according to a second performance that improves upon the first performance. The first and second performances can include, but are not limited to, fuel burn set points, fuel consumption efficiency set points, and life cycle cost efficiency set points.

Figure 3:
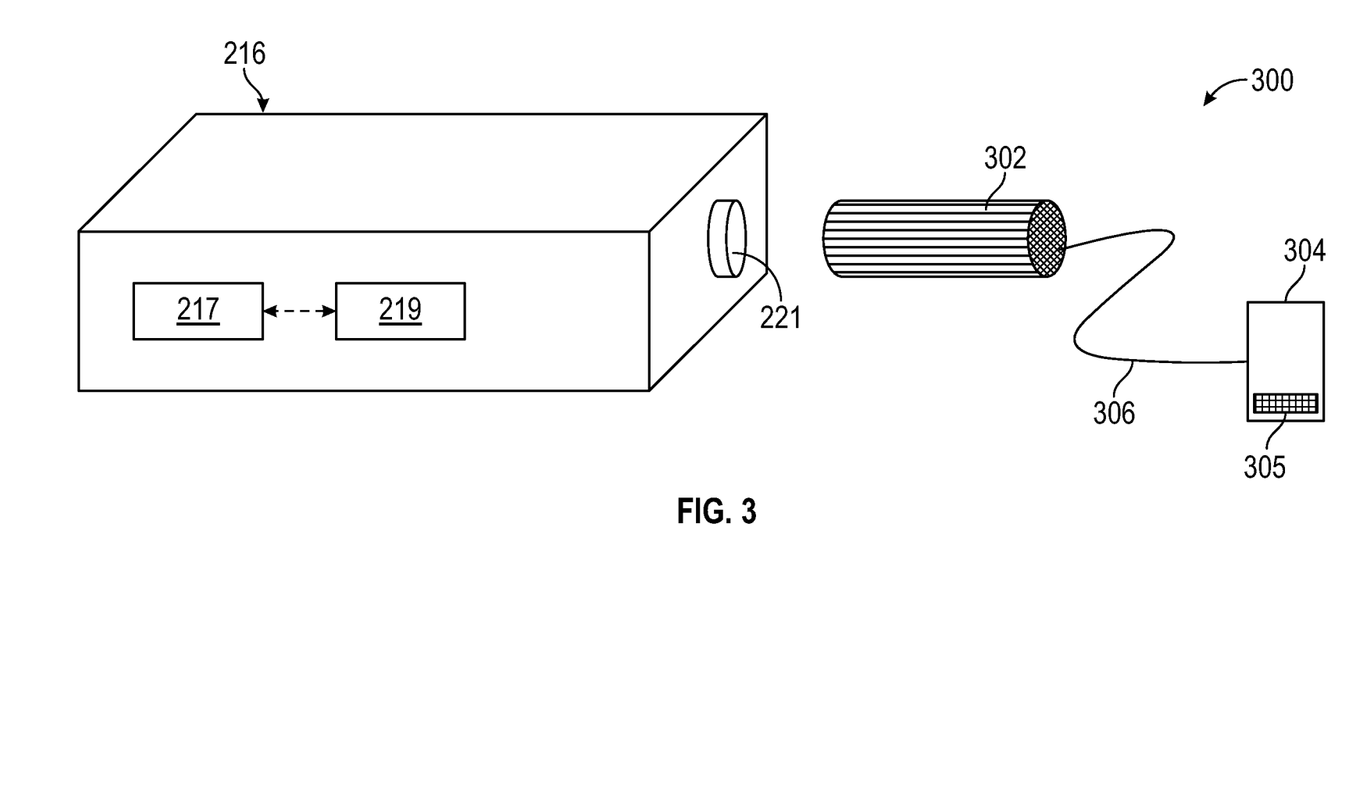
FIGS. 3 and 4 are block diagrams illustrating a controller updating device configured to update a controller included in the power management system of FIG. 2, in accordance with a non-limiting embodiment of the disclosure.
Figure 4:
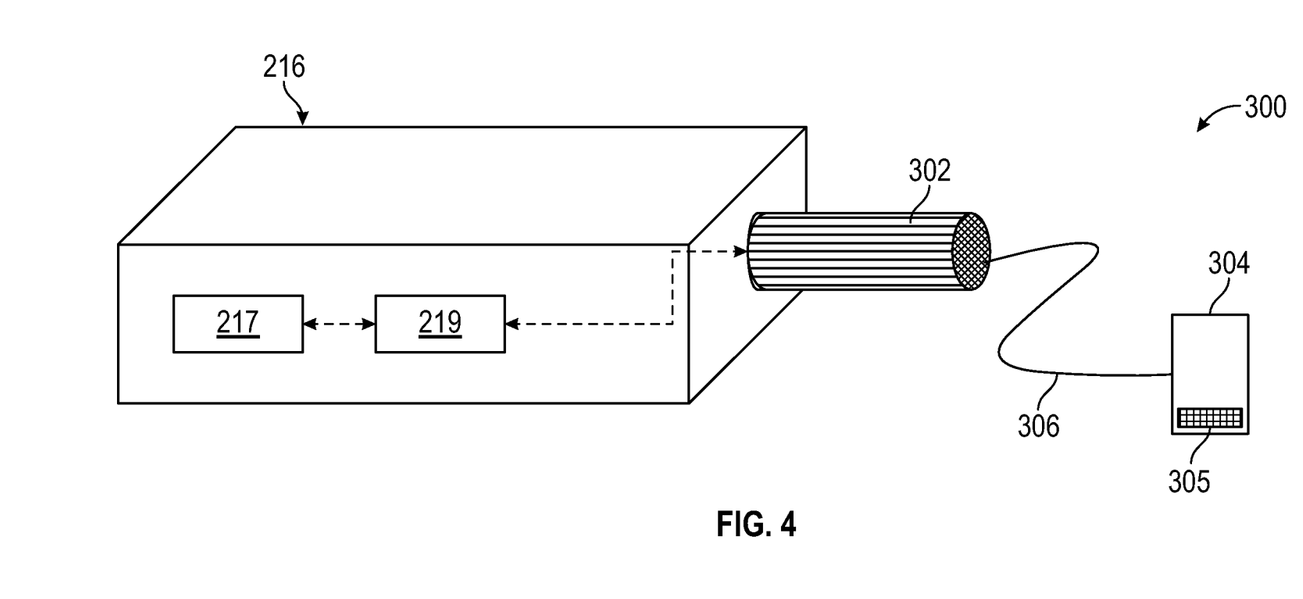

Turning now to FIGS. 3 and 4, a controller updating device 300 configured to update the software installed in the controller 216 is illustrated according to a non-limiting embodiment. The controller 216 includes an algorithm storage unit 217 and a tuning parameters storage unit 219. Although the algorithm storage unit 217 and the tuning parameters storage unit 219 are illustrated as separate individual units, it should be appreciated that the algorithm storage unit 217 and the tuning parameters storage unit 219 can be implemented as a single storage unit without departing from the scope of the present disclosure.

The algorithm storage unit 217 stores one or more optimization algorithms that utilize tuning parameters stored in the tuning parameters storage unit 219 to control aircraft operation (e.g., thermal versus electrical thrust split) to optimize the performance of the aircraft. Accordingly, the controller 216 can execute an optimization algorithm stored in the algorithm storage unit 217, which utilizes the stored tuning parameters in order to optimize mission fuel burn (e.g., fuel consumption efficiency) and/or engine economics (e.g., life cycle cost efficiency). The tuning parameters stored in the tuning parameters storage unit 219 are associated with parameters and characteristics of the battery system 255 (e.g. the replaceable battery 250). In one or more non-limiting embodiments, the tunning parameters include, but are not limited to, charging rate, discharging rate, thermal characteristics, size, capacity and/or energy per unit mass of the battery currently installed in the battery system 255.

The example illustrated in FIGS. 3 and 4 implement the updating device 300 as a portable connectable device, sometimes referred to as a "lanyard" or "dongle." The controller updating device 300 includes a connector 302 in signal communication with a storage device 304 via one or more signal wires 306. The connector 302 is configured to mate with an input port 221 included on the controller 216. The connector 302 and/or the input port 221 can have various shapes or profiles and are not limited to the shapes or profiles illustrated in the drawings described herein. The input port 221 can include one or more terminals that are connected to a data path that allows data communication with the tuning parameters storage unit 219.

The storage device 304 includes memory and/or a control unit such as, for example, a microcontroller. Although the storage device 304 is illustrated as being external from the connector 302, it should be appreciated, however, that the storage device 304 can be embedded in the connector 302 to provide an integrated memory and control device such as, for example, a flash drive. In one or more embodiments, the storage device 304 can be implemented in a mobile computer device such as, for example, a laptop computer, tablet computer, or various mobile diagnostic tools known skilled in the art.

The storage device 304 stores updated tuning parameters, which include, but are not limited to, the size, capacity and/or energy per unit mass of the battery currently installed in the battery system 255. The updated turning parameters can be manually installed into the storage device 304 to correspond with a particular replacement battery that will be installed in a given aircraft. In one or more embodiments, the updated tuning parameters are associated with parameters and characteristics of a next-generation or updated battery that can be installed in the battery system 255. Future next-generation or updated battery may have improved battery parameters and characteristics compared to a battery currently installed in the battery system 255. Accordingly, in one or more non-limiting embodiments the updated tuning parameters stored in the storage device 304 are different from the tuning parameters currently stored in the tuning parameters storage unit 219 of the controller 216.

When a battery from the battery system 255 is replaced with an updated battery or next-generation battery, the tuning parameters storage unit 219 can be updated with updated tuning parameters that reflect the parameters and characteristics of the replacement battery. In this manner, the optimization algorithms stored in the algorithm storage unit 217 can utilize the updated tuning parameters, and the controller 216 can control aircraft operation (e.g., thermal versus electrical thrust split) to further optimize the performance of the aircraft engine set points based on the capabilities provided by the updated or next-generation battery that is now installed in the battery system 255.

As described herein, the controller updating device 300 can be used to provide the tuning parameters storage unit 219 with the updated tuning parameters associated with an updated or next-generation replacement battery. In the non-limiting embodiment shown in FIG. 4, for example, the connector 302 can be connected to the input port 221 of the controller 216. In one or more non-limiting embodiments, the controller 216 can detect a signal connection with the controller updated device 300 (e.g., in response to connecting the connector 302 to the port 221) and automatically initiate a download operation. In other embodiments, the download operation can be manually initiated. In either scenario, the updated tuning parameters stored in the storage device 304 can be delivered to the tuning parameters storage unit 219 and stored therein.

Once stored in the tuning parameters storage unit 219, the algorithm storage unit 217 can access the updated tuning parameters and the controller can execute one or more optimization algorithms that utilize the updated tuning parameters. At this time, however, the executed algorithm improves the optimization of mission fuel burn (e.g., fuel consumption efficiency) and/or engine economics (e.g., life cycle cost efficiency) due to the increased battery performance capabilities provided by the updated or next-generation battery now installed in the battery system 255.

According to one or more non-limiting embodiments, the controller updating device 300 includes a parameter selector 305 configured to operate in a plurality of states. For example, the parameter selector 305 can be implemented as a DIP switch that includes a plurality of switchable contacts.

The combined positions of the contacts select a given state of the DIP switch. In another example, the parameter selector 305 can be implemented as a potentiometer (sometimes referred to as a variable resistor or rheostat.) The potentiometer can be adjusted so as to vary or select a resistance associated with the updating device 300. Accordingly, each selectable resistance represents a given state of the potentiometer.

In any case, each selectable state of the parameter selector 305 indicates a given updated tuning parameter among the at least one updated tuning parameter to be delivered from the controller updating device 300 to the controller 216. In this manner, a given state of the parameter selector 305 can be manually set so as to select one or more targeted updated tuning parameters to be delivered to the controller 216. Although the parameter selector 305 is illustrated as being installed on the storage device 304, it should be appreciated that the parameter selector 305 can be installed at a different location such as the connector 302, for example, without departing from the scope of the present disclosure.

Figure 5:
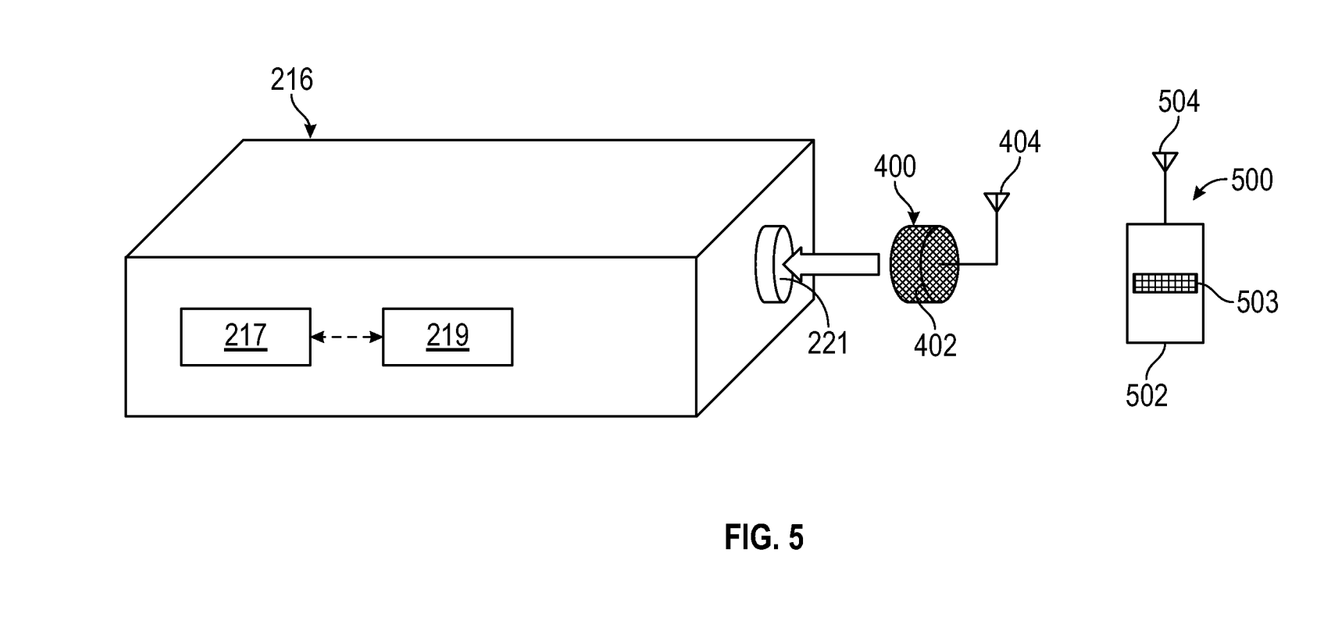
FIGS. 5 and 6 are block diagrams illustrating a controller updating device configured to communicate with a controller adapter to update a controller included in the power management system of FIG. 2, in accordance with another non-limiting embodiment of the disclosure.
Figure 6:
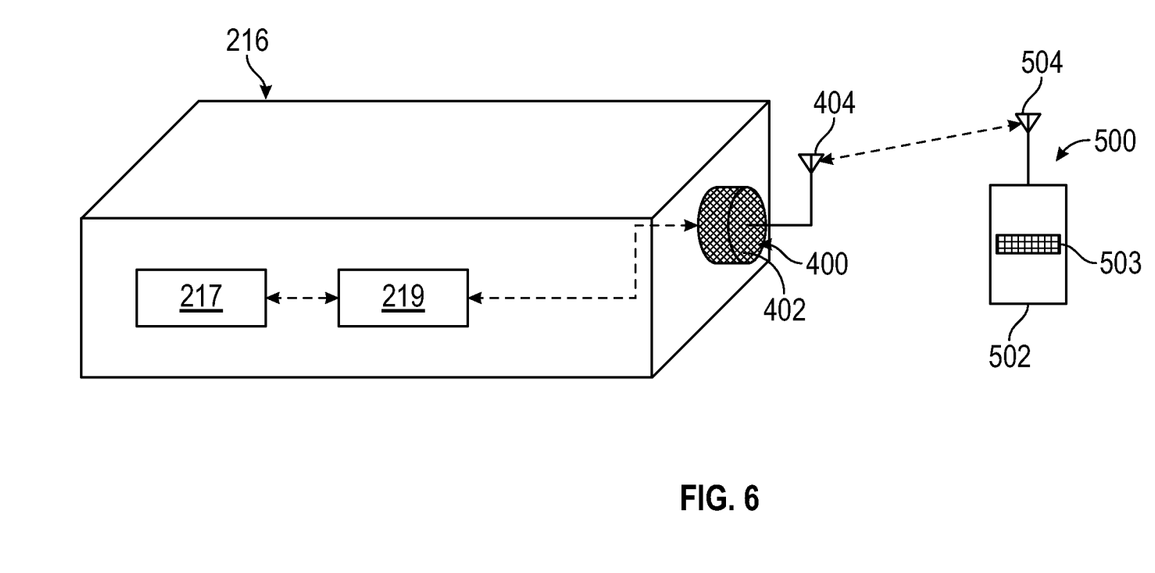

Turning to FIGS. 5 and 6, a controller updating device 500 configured to update tuning parameters stored in the controller 216 is illustrated according to another non-limiting embodiment. In the example shown in FIG. 5, the controller updating device 500 is configured to wirelessly communicate with an adapter 400. The controller updating device 500 in this example, includes a storage device 502 and an antenna 504. The storage device 502 operates similar to the storage device 304 described with respect to FIGS. 3 and 4. For example, the storage device 502 is configured to store updated tuning parameters which correspond to an updated or next-generation replacement battery that can be installed in the battery system 255.

In one or more non-limiting embodiments, the adapter 400 includes a connector 402 and an adapter antenna 404. The connector 402 can be connected to the input port 221 of the controller 216 so as to establish signal communication with the tuning parameters storage unit 219 via one or more data paths. The adapter antenna 404 is configured to exchange data wirelessly with the antenna 504 included with the controller updating device 500. In this manner, the updated tuning parameters stored in the storage device 502 can be wirelessly communicated to the adapter 400 and then stored in the tuning parameters storage unit 219 as illustrated in FIG. 6. Once stored in the tuning parameters storage unit 219, the algorithm storage unit 217 can access the updated tuning parameters as described herein.

The controller updating device 500 in the examples described in FIGS. 5 and 6 can also include a parameter selector 503. As described above, the parameter selector 503 can be utilized to select one or more given updated tuning parameters to be delivered to the controller 216. In this manner, a given state of the parameter selector 503 can be manually set so as to select one or more targeted updated tuning parameters to be delivered to the controller 216.

Figure 7:
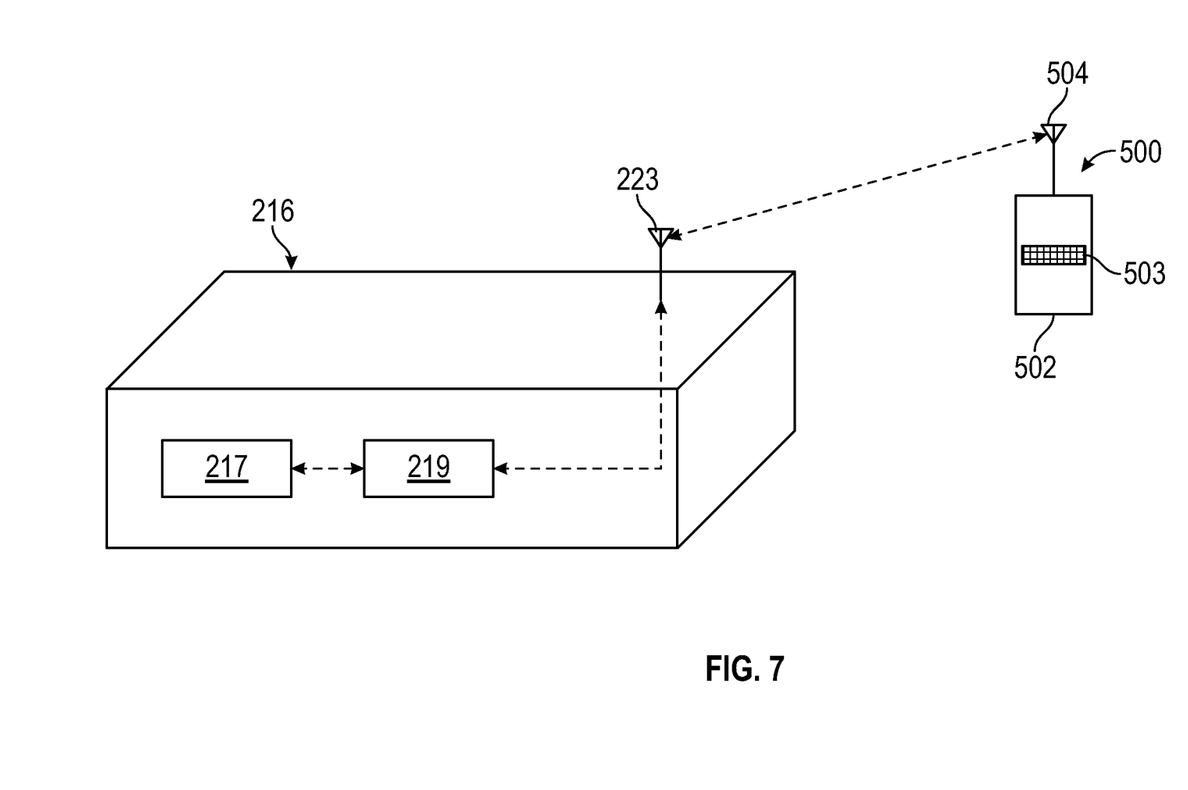
FIG. 7 is a block diagram illustrating a controller updating device configured to communicate with a controller included in the power management system of FIG. 2, in accordance with another non-limiting embodiment of the disclosure.

With reference to FIG. 7, a controller updating device 500 configured to update tuning parameters stored in the controller 216 is illustrated according to another non-limiting embodiment. In this example, the controller 216 is installed with a local antenna 223. That is, rather than rely on a wireless adapter the controller 216 can wirelessly exchange data directly with the controller updating device 500. Accordingly, when an updated battery or next-generation battery is installed in the battery system 255, corresponding updated tuning parameters stored in the storage device 502 of the controller updating device 500 can be wirelessly communicated directly to the controller 216 via the controller's local antenna 223 and stored in the tuning parameters storage unit 219. Once stored in the tuning parameters storage unit 219, the algorithm storage unit 217 can access the updated tuning parameters as described herein.

The controller updating device 500 in the example described in FIG. 7 can also include a parameter selector 503. As described above, the parameter selector 503 can be utilized to select one or more given updated tuning parameters to be delivered to the controller 216. In this manner, a given state of the parameter selector 503 can be manually set so as to select one or more targeted updated tuning parameters to be delivered to the controller 216.

As described herein, various embodiments provide a power management system configured to manage a battery that can be repeatedly replaced over time. In addition, the power management system can receive updated tuning parameters associated with a replacement battery and execute one or more optimization algorithms that utilize the updated tuning parameters to control aircraft operation (e.g., thermal versus electrical thrust split) to optimize the performance of the aircraft. The performance can include, for example, engine set points or targeted set points such as, for example, mission fuel burn (e.g., fuel consumption efficiency) set points and/or engine economics (e.g., life cycle cost efficiency) set points.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. The term "about" is intended to include the degree of error associated with measurement of the particular quantity based upon the equipment available at the time of filing the application. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power management system for a hybrid electric aircraft, the power management system comprising:
   a replaceable battery in signal communication with a hybrid electric propulsion system of the hybrid electric aircraft, the replaceable battery configured to output electric current to power one or more electric motors of the hybrid electric propulsion system;
   a controller in signal communication with the replaceable battery, the controller including a tuning parameters storage unit configured to store at least one tuning parameter corresponding to the replaceable battery, and configured to execute at least one optimization algorithm that utilizes the at least one tuning parameter such that the hybrid electric propulsion system of the hybrid electric aircraft operates according to a first performance, wherein the tuning parameters storage unit is configured to receive at least one updated tuning parameter from a portable controller updating device configured to be entirely connected and disconnected from the power management system and with respect to the replaceable battery, the portable controller updating device including a local storage device configured to store the at least one updated tuning parameter, and wherein the controller executes the at least one optimization algorithm that utilizes the at least one updated tuning parameter such that the hybrid electric propulsion system of the hybrid electric aircraft operates according to a second performance that improves upon the first performance, wherein the first performance and the second performance include one or a combination of fuel burn set points, fuel consumption efficiency set points, and life cycle cost efficiency set points, and wherein the at least one tuning parameter and the at least one updated tuning parameter include one or a combination of charging rate, discharging rate, thermal characteristics, size, capacity and/or energy per unit mass, wherein the controller is configured to control a first thermal versus electrical thrust split of the hybrid electric aircraft based on the replaceable battery installed in the power management system at a first time period, and to control a second thermal versus electrical thrust split of the hybrid electric aircraft different from the first thermal versus electrical thrust split based on a second replaceable battery installed in the power management system that replaces the replaceable battery at the second time period subsequent to the first time period.

2. The power management system of claim 1, wherein the at least one tuning parameter corresponds to the replaceable battery installed in the power management system at the first time period, and wherein the at least one updated tuning parameter corresponds to the second replaceable battery installed in the power management system that replaces the replaceable battery at the second time period subsequent to the first time period.

3. The power management system of claim 2, wherein the controller receives the at least one updated tuning parameter in response to connecting a connector included with the portable controller updating device to an input port included with the controller.

4. The power management system of claim 2, wherein the controller receives the at least one updated tuning parameter in response to wirelessly exchanging data between a wireless adapter connected to an input port of the controller and the portable controller updating device.

5. The power management system of claim 2, wherein the controller receives the at least one updated tuning parameter in response to wirelessly exchanging data between a local antenna of the controller and an antenna of the portable controller updating device.

6. The power management system of claim 1, wherein the portable controller updating device and the local storage device are configured to be entirely connected and disconnected from the power management system and with respect to the replaceable battery.

* * * * *